United States Patent [19]

Nishiyama et al.

[11] 4,059,710

[45] Nov. 22, 1977

[54] PROCESS FOR PLATING SHAPED ARTICLES MADE OF SYNTHETIC RESINS

[75] Inventors: Keizo Nishiyama, Handa; Sadao Maeda, Okazaki; Kohshi Iwata, Tokai, all of Japan

[73] Assignees: Kabushiki Kaisha Toyoda Jidoshokki Seisakusho; Kabushiki Kaisha Maeda Shell Service, both of Japan

[21] Appl. No.: 702,098

[22] Filed: July 2, 1976

[30] Foreign Application Priority Data

July 2, 1975 Japan .................................. 50-82129

[51] Int. Cl.² .............................................. C23C 3/02
[52] U.S. Cl. ................................... 427/307; 427/309; 427/304; 427/430 A; 427/438; 264/129; 264/232; 264/233; 264/338; 204/20
[58] Field of Search ............... 427/438, 304, 305, 306, 427/98, 290; 264/131, 129, 132, 135, 337, 338, 112, 233, 232; 204/20

[56] References Cited

U.S. PATENT DOCUMENTS

| | | | |
|---|---|---|---|
| 2,357,950 | 9/1944 | Goessling | 204/20 |
| 2,454,910 | 11/1948 | Carr | 264/112 |
| 2,690,401 | 9/1954 | Gutzeit | 427/290 |
| 3,226,256 | 12/1965 | Schneble et al. | 427/98 |

FOREIGN PATENT DOCUMENTS 363,432  12/1931  United Kingdom .................. 204/20

*Primary Examiner*—Ralph S. Kendall
*Attorney, Agent, or Firm*—Browdy and Neimark

[57] ABSTRACT

A process for metal plating shaped articles, such as cast or molded articles of synthetic resins, includes the steps of (a) diffusing or scattering numerous fine metal particles (or pieces) over the surface and outermost layer of the articles, (b) etching exposed surfaces of the metal particles, (c) performing thereafter metal plating, (d) and thereby solidly combining or joining the plating layer and the articles through the medium of the fine metal particles, whereby the resulting plated articles are extremely eminent in abrasion and shock resistance which is essentially useful for casting and molding patterns or core boxes.

11 Claims, 4 Drawing Figures

1

PROCESS FOR PLATING SHAPED ARTICLES MADE OF SYNTHETIC RESINS

BACKGROUND OF THE INVENTION

The present invention relates to a process for forming a plating layer over the surface of an article of a synthetic resin, above all casting tools such as patterns and cores or core boxes, more particularly to a process for forming a solid plating layer over the surface of the synthetic resin article through the medium of a fine metal group thickly planted (or embedded) over the outermost layer thereof.

Synthetic resins have recently advanced into the field of metals remarkably because of their characteristics such as light weight, toughness, low cost and so on. Epoxy resin is, in particular, widely used as casting or molding tools, having replaced cast iron and aluminum, since the durability, resistance against rough handling and/or against abrasion by sand thereof have long been recognized. It still can not be said, however, that it is perfect in this use regardless of its biggest strong point, a relatively good resistance against abrasion as by sand; its durability, when used as patterns under severe conditions of high pressure molding and particularly as core boxes subjected to high abrasion, is far from being satisfactory. A further decisive defect resides in that it is far inferior to metal surfaces in the releasability or separability from the mold material for casting, such as molding sand.

Most known patterns made of epoxy resins for casting or molding are gel-coated over the outermost layer of a master pattern and the coating is retained by laminated layers of fiber impregnated with resins. It is next to impossible, however, to evenly or equally perform the gel-coating all over the master pattern surface of intricate shape, since some locally ungelled portions, exposed resin portions, may unavoidably occur.

Attempts at forming a durable plating layer over the surface of synthetic resins, especially of heat resisting ones, for example epoxy resin, have been made. None of them have been, however, successful. In metal plating over the surface of synthetic resins, unlike in intermetallic combinations where solid combinations can be observed, it is hard to expect solid combination between the base of the resin and the metal plated, where a mere physical clinging or sticking will occur that is weak in combining force. There is only one exception, that is ABS resin which barely can be said practicable due to the chemical etching applied thereon, while some other resins, such as polyethylene have been reported to be platable, however, it is no exaggeration to say that no practically successful metal plating processes on synthetic resins have yet been developed.

SUMMARY OF THE INVENTION

A primary object of this invention is to provide an eminent plating process over the surface of cast or molded articles of synthetic resins.

Another object of this invention is to manufacture articles of synthetic resins, over the surface of which is being solidly settled an abrasion resistant plating layer, more specifically, to manufacture patterns and cores or core boxes made of synthetic resins for use in casting or molding.

A further object of this invention is to apply metal plating over an article of a synthetic resin having fine metal particles or pieces over the surface, at least in the outermost layer thereof, and to thereby solidly combine or join the plating layer and the article through the medium of the fine metal particles or pieces.

Other objects and advantages of this invention will become apparent from the reading of the following detailed description in conjunction with appended drawings.

BRIEF DESCRIPTION OF THE DRAWINGS

FIGS. 1 through 4 are cross-sectional photographic views of a sample piece of epoxy resin chemically plated thereover with nickel in accordance with this invention wherein:

FIG. 1 shows a case in which fine Fe particles have been used;

FIG. 2 is similarly a case of Zn particles;

FIG. 3 is similarly a case of Cu particles; and

FIG. 4 is similarly a case of Al particles.

FIG. 5 is an elevational view of a sample piece used in an abrasion comparative experiment.

DESCRIPTION OF THE PREFERRED EMBODIMENT

Figure 2:
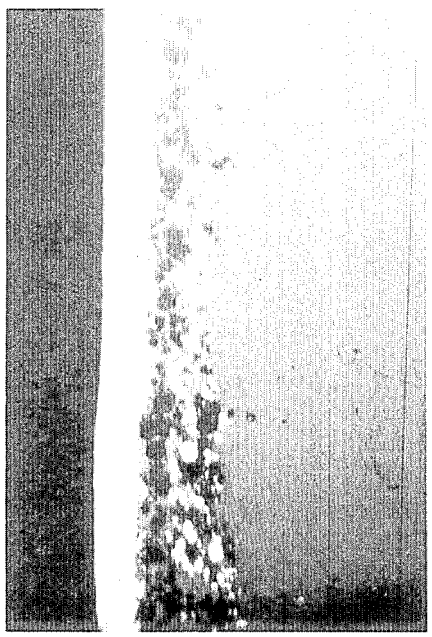

This invention concerns a process for solidly or integrally settling or forming a plating layer of high abrasion resistance over the surface of articles made of synthetic resins, especially articles of intricate shapes, such as mold patterns, or casting tools. It can be achieved through the steps of (a) applying an adhesive agent over the surface of a master pattern to make a shaped article; (b) firmly diffusing fine metal particles or pieces over the adhesive agent layer; (c) pouring molten/synthetic resin thereover; (d) separating the solidified or shaped synthetic resin from the master pattern to substantially form a shaped synthetic resin mold pattern or casting tool thickly covered on the outermost layer thereof with a group of fine metal particles; (e) after removing the adhesive applied, etching at least the surface of the metal group; and (f) thereafter effecting metal plating over the required entire surface of the synthetic resin, including at least one layer of chemical plating. A preferred embodiment of this invention will be described in accordance with the procedural order thereof.

First of all, a release agent which in grease-like or liquid, that is a usually known oily release agent such as silicone oil, etc., is applied over the surface of the master pattern to be copied which is usually made of metallic material(s); thereafter a water soluble adhesive agent such as dextrin, polyvinyl alcohol, etc., is applied by means of spraying or brushing; then fine metal particles or pieces are diffused over the already applied adhesive agent, before its adhesive ability is lost by drying or any other reasons, with a sieve for example, wherein usable metal is iron, aluminum, zinc, copper, or copper alloy although not necessarily limited to the above-mentioned. The particle size of the metal should approximately be in the range from 50 to 300 mesh, preferably accepted size being from 100 to 200 mesh. For the purpose of attaining combining ability large enough to assure anchoring effect between the metal particles and the adhesive agent, the synthetic resin to be formed and the later described plating layer, an appropriate selection and arrangement of metals non-uniform particle size is rather desirable.

It is helpful in retaining the metal particles in good state by the adhesive agent to stamp the surface of the master pattern covered with the metal particle, after having diffused the metal particles, in a suitable way. A well-known vibration method and a metal particle planting method such as an electrostatic flocking process are both highly useful for settling the fine metal group down into the adhesive agent layer, too. Synthetic resins, for example epoxy resin, to be shaped will be thereafter poured in, in a molten state; for the purpose of increasing the number of metallic points being exposed in the solidified outermost layer of the synthetic resin, an appropriate amount of finer metal particles may be mixed with ordinary sized particles in the synthetic resin and/or the adhesive agent. A great care must be taken not to exceed the maximum mixing ratio of the fine metal group to the synthetic resin, about 25% by weight in any case, because fluidity of the resin beyond this limit is normally degraded to a remarkable extent.

As a preferable example of a metal plating applicable to the present invention, chemical nickel-plating process will be described. A pattern of synthetic resin separated from the master pattern is deprived of residual strains by repeated heating at temperatures 90° - 100° C; thereafter (a) on the surface of the synthetic resin pattern the metal particles can be exposed by means of scrubbing the surface in water with relatively fine grained waterproof sand paper, and (b) by degreasing cleansing with aqueous solution of sodium bicarbonate and water cleansing, the above-mentioned separating agent and the cleansing alkaline solution will be completely removed. The entire pattern surface including the exposed fine metal group may be coarsened by etching, through immersing in an aqueous solution of $HNO_3$-$NaHF_2$, for the purpose of improving the later described settlement of the plating layer.

The pattern, upon having been cleansed with water again, is subjected to sensitization with aqueous solution of stannous chloride followed by an activation treatment with aqueous solution of palladium chloride resulting in formation of activated catalyzer of palladium over the pattern surface. Upon finishing such a catalyzing process, a well-known chemical copper plating is applied; a further desirable process is to perform another activation treatment followed by a chemical nickel plating by hypophosphite bath (containing nickel sulfate) for finalizing the plating layer formation.

Figure 4:
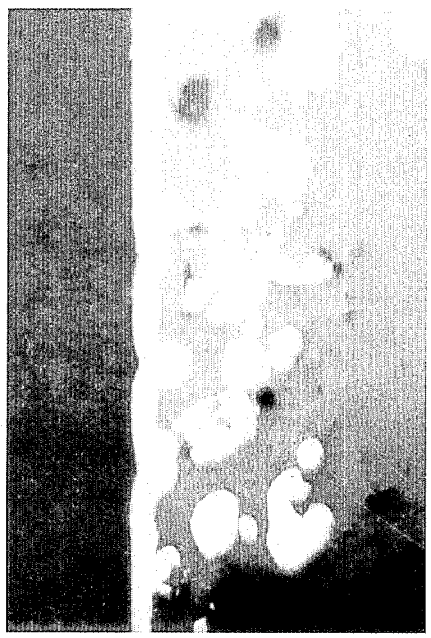
Figure 1:
Figure 3:
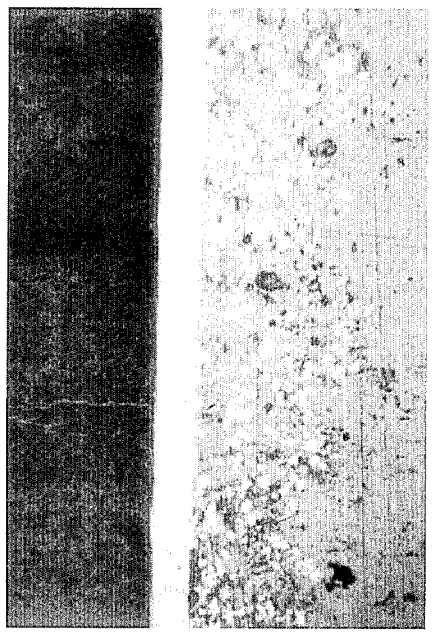

The appended FIGS. 1 to 4 are enlarged cross-sectional photographic views wherein intermetallic combinations between the exposed surfaces of the fine metal particles diffused or scattered in the outermost layer of the synthetic resin and the plated metals occur, whereby the base of the synthetic resin is solidly bound with the plating layer, and the function of the fine metal particles as a good retainer medium can be evidently observed, therein, respectively; Fe particles shown in FIG. 1, Zn particles in FIG. 2, and Cu particles in FIG. 3 (all of these fine metal particles are of 200 mesh size) all serve well as good retainer media. An enlarged picture of Al particles in FIG. 4 (the Al particles are of 80 - 200 mesh size) shows more clearly the above-mentioned retaining condition.

FIG. 5 shows a sample piece made of epoxy resin. Such a sample piece, denoted with (A) is composed with another sample piece, denoted with (B), which has applied thereto a chemical nickel-plating (Ni-P alloy) in accordance with this invention. Experimental data of abrasion tests on these sample pieces are indicated in the following table, wherein the test is carried out in the form of thrusting the subjects (the samples) into artificial silica sand and the wear condition appearing in the central portion of the lower end surface (the left end surface in the Figure) of the sample pieces are observed. In the sample piece (A), for example, wear of 0.1 mm can be measured after 20,000 times of shot while in the sample piece (B) wear does not go beyond 0.04 mm after as many as 65,000 times of shot. In the latter case no defect of exfoliation (peeling-off) could be seen, and the Vicker's Hardness of the outermost plated layer was in the range of Hv500 - 600.

| number of shots | abrasion in the thickness in mm | |
|---|---|---|
| | A | B |
| 5,000 | 0.017 | 0.007 |
| 10,000 | 0.052 | 0.007 |
| 20,000 | 0.100 | 0.021 |
| 30,000 | 0.125 | 0.021 |
| 40,000 | 0.140 | 0.021 |
| 50,000 | 0.160 | 0.028 |
| 60,000 | 0.185 | 0.039 |
| 65,000 | 0.194 | 0.040 |

The above-mentioned chemical nickel-plating is highly suitable, in addition to being good for the patterns for casting, for various kinds of patterns of molding or casting where separability (releasability) and uniformity of coating thickness are particularly needed. It is indisputably feasible to practice electroplating in the articles of synthetic resins wherein dullness or swelling at edged portions is permitted.

As can be well understood from the above-mentioned description the present invention is to replant the fine metal group, in the form of particles or pieces, being retained in the adhesive agent layer in advance to the outermost layer of the synthetic resin to be poured to form molding patterns or cores, and to provide a strong and durable metal plating layer over its surface through the medium of the fine metal group exposedly and thickly planted thereover.

The present invention is thus of highly practical value and of excellent effect in that, while advantageously maintaining the characteristic of light weight and toughness, it can readily settle a durable and anti-abrasive metal layer, eminent in separability, widely on synthetic resin shaped articles for various use, not necessarily limited to the patterns for molding use.

For example, in the present invention at least a layer of chemical plating is essential, however, the process of the chemical plating and its preliminary processes, such as etching, sensitizing, and activating are not limited in the processes described in the specification, because chemical plating methods of various metals have been established. Any of the conventional chemical or electroless plating methods may be applicable to the present invention, so far as the plating is suitable for the successive plating of the shaped article and the successive plating of the shaped article and the successive or final plating may be a conventional electro-plating of metal.

As for etching processes, aqueous solution of HCl or HF may be suitably used for Fe or Cu particles; aqueous solution of $HNO_3$ or $HNO_3$ containing $NaHF_2$ may be recommendably used for Al or Al-alloy particles.

As for metal particles, a mixture of differently sized particles may be more effective to the present invention, if finer particles be disposed in gaps between larger particles in such a way as to increase the total number of exposed points of the metal particles, when etched.

It will be obvious to those skilled in the art that various changes may be made without departing from the scope of the invention and the invention is not to be considered limited to what is shown in the drawings and described in the specification.

What is claimed is:

1. Process for plating a casting tool of a synthetic resin, comprising the steps of:
   a. applying an adhesive agent over the surface of a master pattern used to shape said article;
   b. diffusing fine metal particles or pieces of non-uniform particle size over the layer of adhesive agent to cause said particles or pieces to settle densely over the surface of the master pattern;
   c. pouring said synthetic resin in a molten state in order to shape the casting tool further over said adhesive agent;
   d. solidifying the synthetic resin;
   e. separating the solidified synthetic resin from the master pattern;
   f. removing the adhesive agent to expose surfaces of the metal particles or pieces;
   g. etching the exposed surfaces of the metal particles or pieces; and
   h. chemically plating metal over the surface of the article.

2. The process claimed in claim 1, further comprising the step of applying separating agent over the surface of the master pattern just before applying the adhesive agent thereon.

3. The process claimed in claim 1, wherein the adhesive agent is a water soluble agent.

4. The process claimed in claim 3, wherein said removing step (f) comprises scrubbing the surface of the shaped separated article in water, in order to remove the adhesive agent therefrom.

5. The process claimed in claim 1, wherein said chemical metal plating is chemical nickel-plating.

6. The process claimed in claim 1, further comprising a step of mixing fine metal particles or pieces into the synthetic resin in an amount not exceeding 25% by weight thereof.

7. The process claimed in claim 1, further comprising the step of stamping the surface of the master pattern covered with the metal particles or pieces, after said step (b) and before said step (c).

8. The process claimed in claim 7 wherein the size of the metal particles pieces is in the range from 50 to 300 mesh.

9. The process claimed in claim 8, wherein the synthetic resin is epoxy resin.

10. The process claimed in claim 9, wherein the size of the metal particles or pieces is in the range of from 80–200 mesh, including at least some particles at least 100 mesh.

11. The process claimed in claim 10 wherein the metal particles or pieces are selected from the group consisting of iron, aluminum, zinc, copper, and copper alloy.

* * * * *